May 6, 1924.
O. MARTIENSSEN
1,493,215
ARRANGEMENT ON GYROCOMPASSES FOR PREVENTING ERRORS DUE TO ROLLING OF THE VESSEL
Filed Aug. 31, 1921
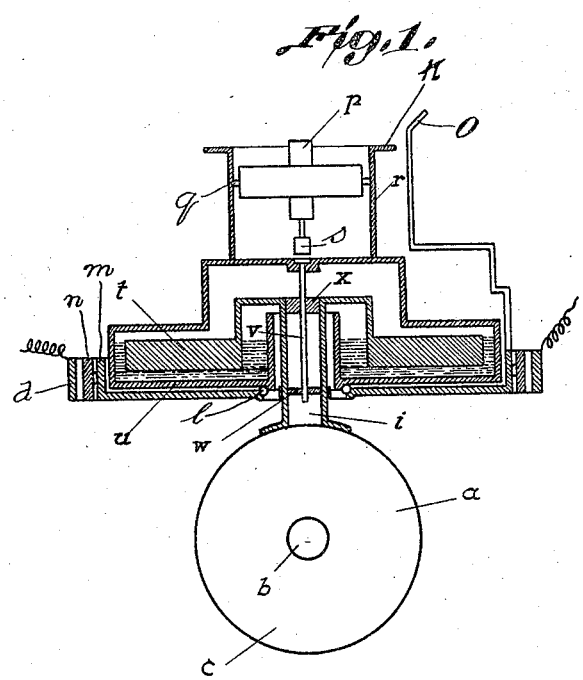
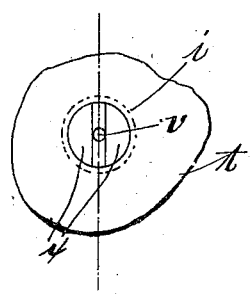
Inventor
Oscar Martienssen Patented May 6, 1924.

1,493,215

UNITED STATES PATENT OFFICE.

OSCAR MARTIENSSEN, OF KIEL, PRUSSIA, GERMANY.

ARRANGEMENT ON GYROCOMPASSES FOR PREVENTING ERRORS DUE TO ROLLING OF THE VESSEL.

Application filed August 31, 1921. Serial No. 497,420.

(GRANTED UNDER THE PROVISIONS OF THE ACT OF MARCH 3, 1921, 41 STAT. L., 1313.)

*To all whom it may concern:*

Be it known that I, OSCAR MARTIENSSEN, citizen of the German Republic, and residing at Kiel, county of Schleswig-Holstein, State of Prussia, Germany, have invented certain new and useful Improvements in Arrangements on Gyrocompasses for Preventing Errors Due to Rolling of the Vessel (for which I have filed applications in Germany May 30th, 1916, Patent Number 308,722, granted June 25th, 1918; England, July 10th, 1920, Patent Number 148,965, granted November 10th, 1921; Austria, October 25th, 1917, Patent Number 79,138, granted August 12th, 1919), of which the following is a specification.

It is known that a gyro-compass on a ship, when affected by the rolling of the vessel, assumes a position that deviates more or less from the meridian. This deviation is caused by oscillations which, when the ship rolls, are executed by the indicating movement of the gyro-compass about an axis lying parallel to the axis of the compass. Hence to obviate the error due to rolling of the gyro-compass it is necessary to suppress these oscillations as far as possible or to prevent them from occurring. This is effectually accomplished by making the natural periodic time of these oscillations of the said movement much greater than the period of oscillation of the lurching of the ship. A known manner of fulfilling this requirement consists in distributing the masses in such a way that, as regards oscillations about the axis of the gyro, the movement is almost balanced. Now by this measure a coincidence of the periodic time of the movement and a harmonic of the rolling motion, and hence the occurrence of very large oscillations of the movement can be prevented, but is difficult to attain a time period of oscillation appreciably greater than the period of the rolling movement, without detriment to the stability of the movement required in practical use. The object of the invention is to fulfil the requirement first mentioned without involving the said disadvantage.

In accordance with the invention this is accomplished by associating with the meridian gyro a gyro having a vertical spinning axis and by arranging the latter in such a manner that it does not hinder the movements of elevation of the indicating gyro. The gyro with the vertical axis may be associated with the indicating movement itself or, if the apparatus is equipped with a follow-up device that causes the movements of the gyro to be followed by members associated with it, it may be associated with this device.

In my copending application, Serial No. 497,419, which relates to similar subject matter, I have utilized the idea underlying the present invention in a form, in which the vertical gyro is more or less rigidly mechanically connected to the meridian gyro structure through suitable pivotal connections between the several supporting elements of the meridian gyro, allowing freedom of motion in certain directions only.

Such vertical gyro would however not perform the function above referred to if the indicating movement comprising the meridian gyro is supported by a float and is kept in the proper position relatively to the float chamber in the customary manner, for instance by means of a centering pin or the like, and if the vertical gyro were in that case suitably mounted on the proper portion of this chamber.

Hence it is necessary in such cases to employ special means which prevent the floating gyro movement from oscillating relatively to the float containing vessel about a horizontal axis which runs in parallel to the axis of rotation of the meridian gyro.

The present invention relates to means of this kind and comprises the usual centering pin which keeps the meridian gyro casing and the float chamber in central alinement, and guiding means cooperating with the center pin which, although permitting the meridian gyro to adjust itself to the proper angle of elevation by swinging on a horizontal axis extending at right angles to its spinning axis, yet prevent the indicating gyro movement from swinging or turning about a horizontal axis that is parallel to the gyro axis.

A constructional form of the invention in which the guiding members are attached to the floating gyro movement and the centering pin is carried by the float containing vessel is illustrated in the drawing, in which—

Fig. 1 shows in more or less diagrammatical form a longitudinal vertical section through a gyro-compass; and Fig. 2 shows a detail plan view in larger scale of the guiding cheeks for the centering pin of the indicating gyro movement.

Referring to Fig. 1 $a$ is the meridian gyro with the axis of rotation $b$ and the casing $c$, which is suspended by a pendant $i$ carried by a float $t$ in a float containing vessel $u$ partly filled with mercury. Mounted on the mercury vessel $u$ is a chamber $r$ in which is mounted a vertical gyro $p$, i. e. a gyro having a vertical spinning axis. The vessel $u$ also carries a centering pin $v$ which passes through a perforated plate $w$ fixed to the pendant $i$. Float chamber $u$ is mounted centrally on a supporting frame $m$ in which it can rotate in a horizontal plane by means of a ball race $l$, frame $m$ being pivotally mounted in a Cardan suspension in ring $n$, which in turn is pivotally mounted in the outer compass frame $d$. The upper portion $r$ of float chamber $u$ carries a compass chart $h$ which cooperates with a fixed indicating mark $o$ mounted on frame $m$. Furthermore, it is assumed that in the structure according to the present invention, means are provided in the compass structure by which float chamber $u$ always follows the horizontal indicating movements of the meridian gyro axis $b$, by which thus the compass chart is moved. Follow-up devices of this character are quite commonly employed in gyro compasses of this character and have therefore been omitted in the drawings.

In accordance with the invention the pendant $i$ is provided above the perforated plate with two cheeks $x$ between which the pin $v$ extends, the clearance between the pin and the cheeks being very small. The arrangement of the cheeks is such that the slit between them extends in the direction of the meridian gyro axis $b$, and is thus visible in Fig. 1 only endwise. It is shown in Fig. 2 in plan view. Hence the floating gyro movement remains capable of executing oscillations of elevation, i. e., it can oscillate on a horizontal axis extending at right angles to the meridian gyro axis $b$. It cannot however carry out oscillations in a plane at right angles to the gyro axis $b$, i. e., about a horizontal axis which extends parallel to the gyro axis $b$, without overcoming a certain resistance, offered by the float chamber $u$ due to the resistance in turn offered by the vertical gyro $p$ against such movement of the chamber.

The resistance offered by vertical gyro $p$ to such undesired rotation of the indicating meridian gyro movement, results in a precession of the vertical gyro in a direction substantially parallel to the plane of elevation of the meridian gyro axis $b$. If the casing of the vertical gyro $p$ is altogether rigidly attached at $q$ to casing $r$, such precession has no detrimental effect on the indications of the meridian gyro, since it occurs in the direction of the guide slot formed by cheeks $x$, in which centering pin $v$ may freely slide. Thus only float chamber $u$ and frame $m$ will tilt on its gimbals. On the other hand, if pins $q$ constitute a pivotal attachment of the vertical gyro casing to casing $r$, such attachment being made on a pivotal axis at right angles to the meridian gyro spinning axis, the above mentioned precession of the vertical gyro $p$ occurs on this pivotal axis and has thus no effect upon the meridian gyro. In this latter case, however, vertical gyro $p$ should be provided with a weight $s$ by which its center of gravity may be placed sufficiently below its pivotal axis to secure the return of this gyro into vertical position. The details of the contrivance may be arranged in various ways. Obviously the guide members $x$, may be attached to the float chamber $u$, and the centering pin to the float, and the vertical gyro $p$ may be mounted at any other suitable place at which the effect previously described is obtained.

I claim:

1. In an arrangement in a gyro compass for preventing errors due to rolling motions of the ship, the combination of a meridian gyro, a float for supporting said gyro, a float chamber containing said float and means for centering said float relatively to said chamber, said centering means having means for permitting said float to oscillate relatively to the chamber in the direction of the plane of elevation of the meridian gyro axis, and for preventing such oscillation in a plane at right angles thereto, and a vertical gyro mounted at a suitable point of the entire indicating movement and adapted to offer resistance to any force tending to oscillate the indicating movement in a direction at right angles to the meridian gyro spinning axis.

2. In an arrangement in a gyro compass for preventing errors due to rolling motions of the ship, the combination of a meridian gyro, a float for supporting said gyro, a float chamber containing said float and means for centering said float relatively to said chamber, said centering means having means for permitting said float to oscillate relatively to the chamber in the direction of the plane of elevation of the meridian gyro axis, and for preventing such oscillation in a plane at right angles thereto, and a vertical gyro mounted on said float chamber and adapted to offer resistance to any force tending to oscillate the indicating movement in a direction at right angles to the meridian gyro spinning axis.

3. In an arrangement in a gyro compass for preventing errors due to rolling motions of the ship, the combination of a meridian gyro, a float for supporting said gyro, a float chamber containing said float and means for centering said float relatively to said chamber, said centering means having means for permitting said float to oscillate relatively to the chamber in the direction of the plane of elevation of the meridian gyro axis, and for preventing such oscillation in a plane at right angles thereto, and a vertical gyro mounted on said float chamber on a horizontal pivotal axis extending at right angles to the meridian gyro spinning axis, said vertical gyro adapted to offer resistance to any force tending to oscillate the indicating movement in a direction at right angles to the meridian gyro spinning axis.

4. In an arrangement in a gyro compass for preventing errors due to rolling motions of the ship, the combination of a meridian gyro, a float for supporting said gyro, a float chamber containing said float and means for centering said float relatively to said chamber, said centering means comprising a centering pin fixed at one end on said float chamber, a centering disk on said float, engaging said pin near its free end, and a pair of cheeks attached to said float at opposite sides of said pin between its ends and forming a slot extending in the direction of the elevation plane of the meridian gyro, said centering means permitting said float to oscillate relatively to the chamber in the direction of the plane of elevation of the meridian gyro axis, and for preventing such oscillation in a plane at right angles thereto, and a vertical gyro mounted at a suitable point of the entire indicating movement and adapted to offer resistance to any force tending to oscillate the indicating movement in a direction at right angles to the meridian gyro spinning axis.

5. In an arrangement in a gyro compass for preventing errors due to rolling motions of the ship, the combination of a meridian gyro, a float for supporting said gyro, a float chamber containing said float and means for centering said float relatively to said chamber, said centering means comprising a centering pin fixed at one end on said float chamber, a centering disk on said float, engaging said pin near its free end, and a pair of cheeks attached to said float at opposite sides of said pin between its ends and forming a slot extending in the direction of the elevation plane of the meridian gyro, said centering means permitting said float to oscillate relatively to the chamber in the direction of the plane of elevation of the meridian gyro axis, and for preventing such oscillation in a plane at right angles thereto, and a vertical gyro mounted on said float chamber on a horizontal pivotal axis extending at right angles to the meridian gyro spinning axis, said vertical gyro adapted to offer resistance to any force tending to oscillate the indicating movement in a direction at right angles to the meridian gyro spinning axis.

In testimony whereof I affix my signature in presence of two witnesses.

OSCAR MARTIENSSEN.

Witnesses:
 KARL HANS BUSCH,
 WILHELM FISCHBURG.